United States Patent [19]

Williams, Jr. et al.

[11] 3,709,309
[45] Jan. 9, 1973

[54] ELECTRONIC WEIGHING SYSTEM WITH DIGITAL READOUT

[75] Inventors: Roger B. Williams, Jr., Sylvania; Richard C. Loshbough, Toledo; Stanley A. Deitemeyer, Sylvania, all of Ohio

[73] Assignee: Reliance Electric Company, Toledo, Ohio

[22] Filed: Sept. 30, 1971

[21] Appl. No.: 185,045

[52] U.S. Cl. ............... 177/165, 177/210, 177/DIG. 3
[51] Int. Cl. ........................ G01g 13/14, G01g 3/14
[58] Field of Search ...... 177/1, 15, 50, 165, 210, 211, 177/DIG. 1, DIG. 3

[56] References Cited

UNITED STATES PATENTS 2,931,639  4/1960  Lauler et al. .............................. 177/3
3,172,493  3/1965  Koch et al. ............................. 177/210
3,565,194  2/1971  Engle et al. ............................. 177/50

Primary Examiner—George H. Miller, Jr.
Attorney—Thomas H. Grafton

[57] ABSTRACT

An improved electronic weighing system with a digital readout. A transducer establishes an analog signal corresponding to an unknown weight. The analog signal is amplified, digitized with an analog-to-digital converter and applied to the digital readout. Circuitry is provided for automatically zeroing the analog portion of the system while the transducer output is momentarily interrupted and for filling gaps in the analog signal resulting from the interruption of the transducer output. The digital portion of the system also includes tare weight provisions for modifying the indicated weight, and circuitry for changing the range and the resolution or increment of the weighing system.

11 Claims, 6 Drawing Figures

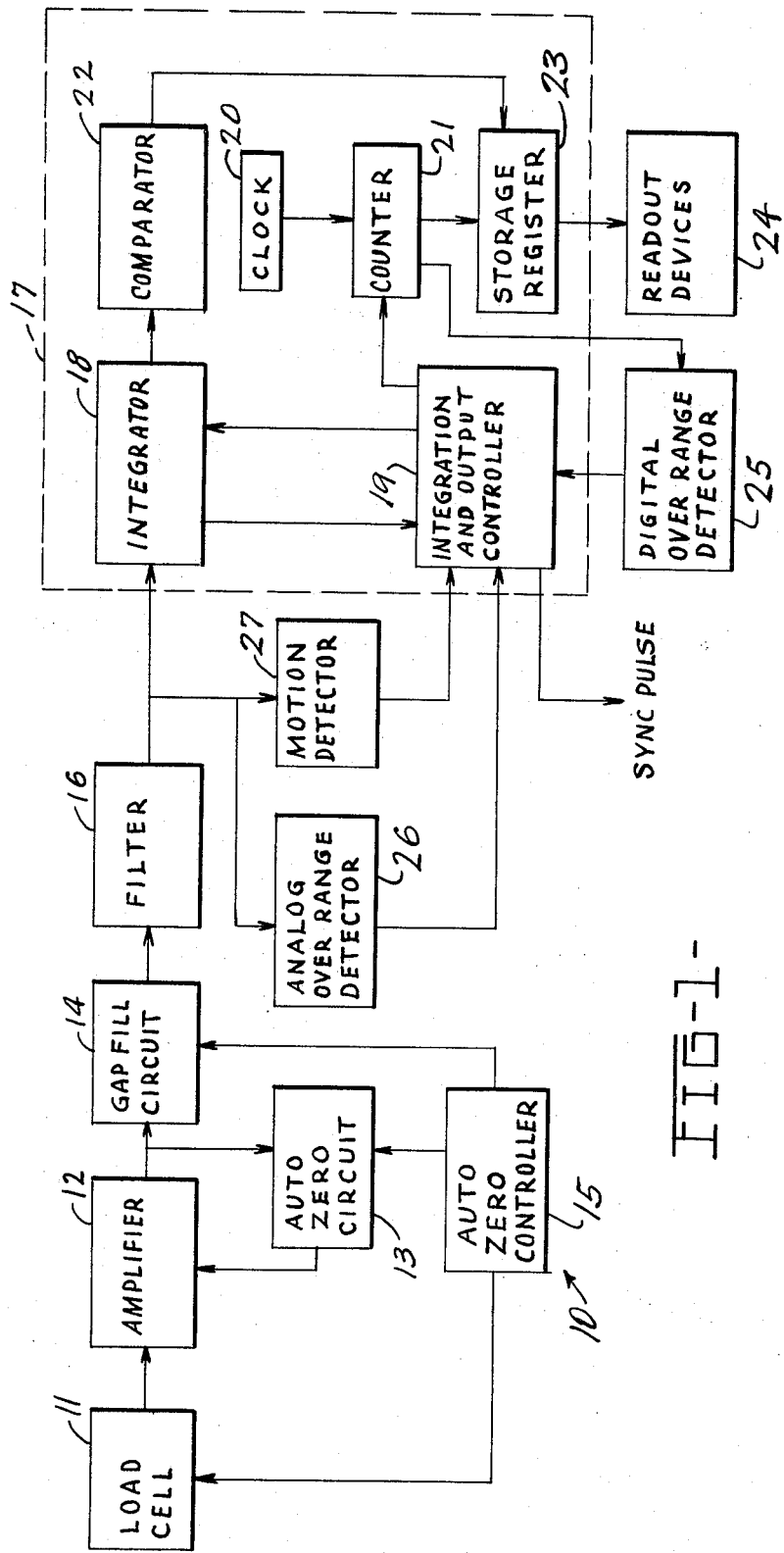
FIG-1-

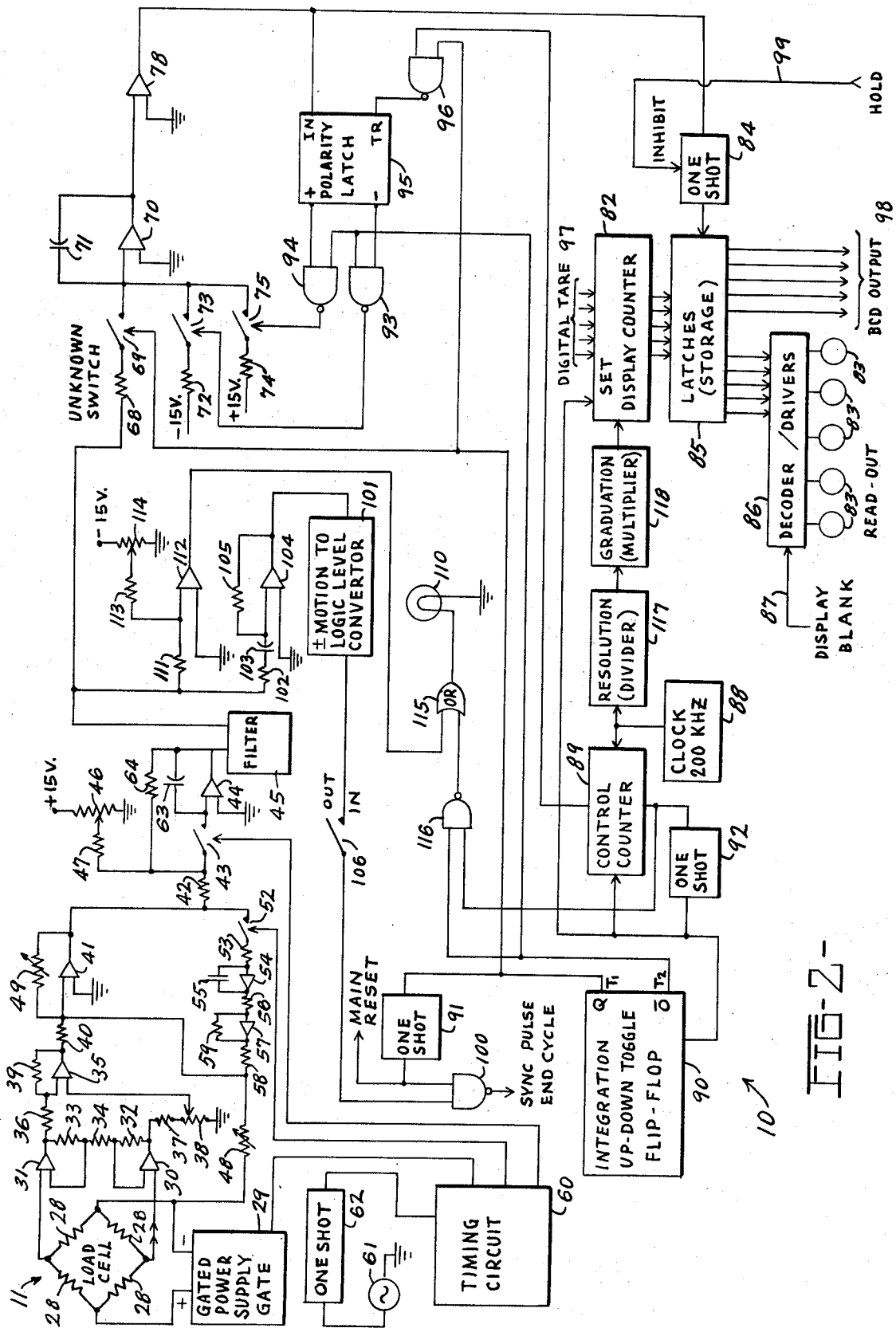

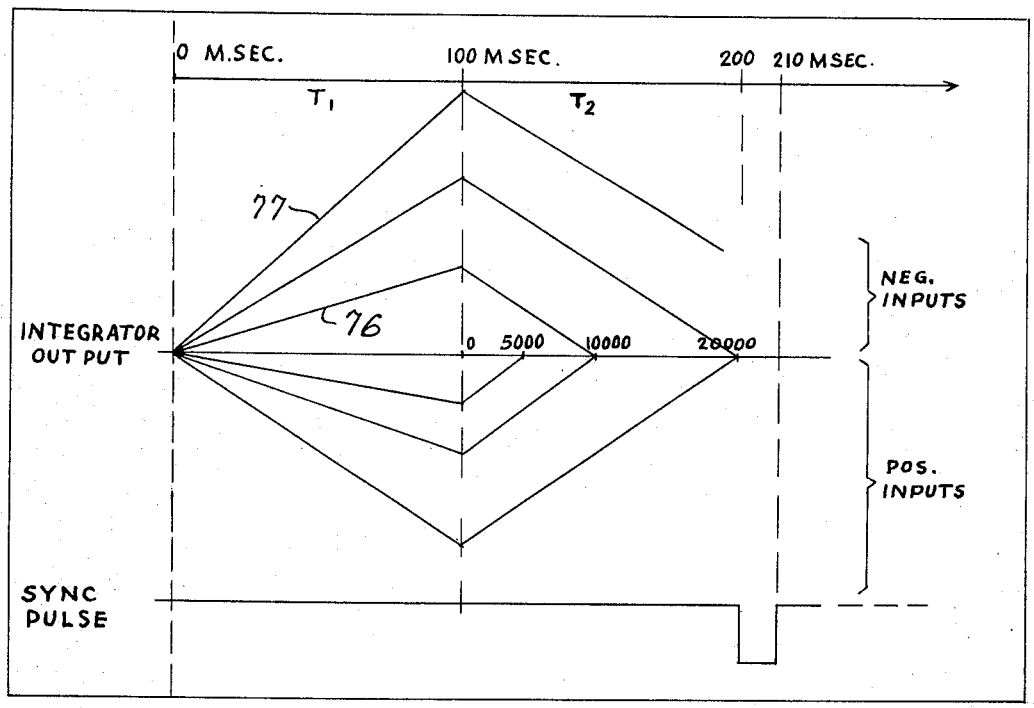
FIG-4-
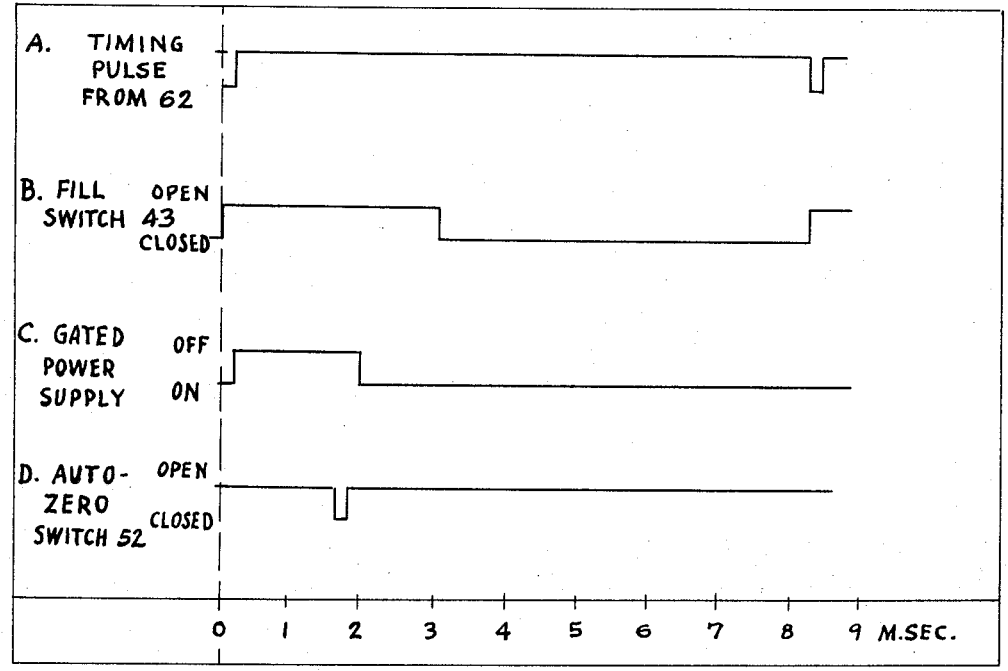
FIG-3-

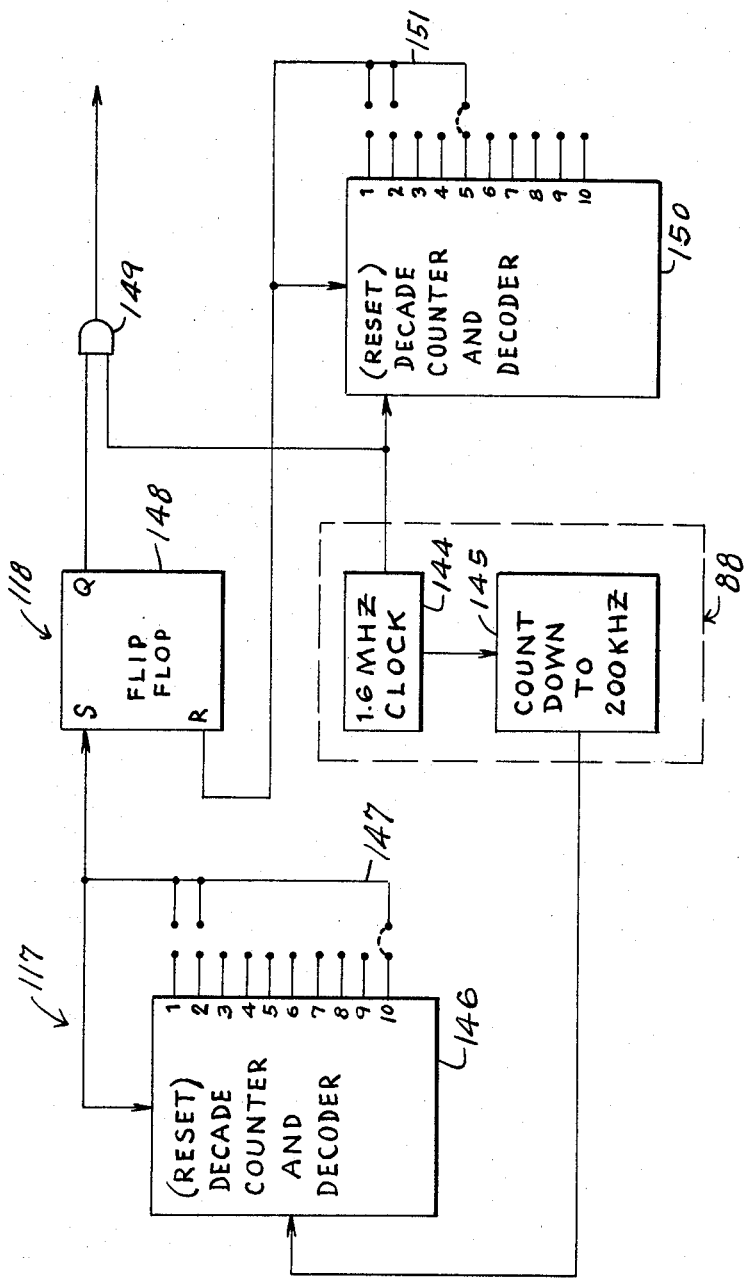
FIG-6-

ELECTRONIC WEIGHING SYSTEM WITH DIGITAL READOUT

BACKGROUND OF THE INVENTION

This invention relates to weighing, and more particularly to improved circuitry for an electronic weighing system having a digital readout.

In recent years, electronic techniques have been increasingly applied to the weighing field. Electronic scales and weighing systems have been developed which provide a fast readout in a digital format without the use of springs and similar mechanical devices. In one type of electronic weighing system, load cells or similar transducers are used to provide an analog voltage or signal which is proportional to the weight of an unknown load. The analog signal is amplified and applied to an analog-to-digital converter for generating a digital output signal corresponding to the weight of the load.

Problems have at times occurred with scales of this type. One problem has resulted from the presence of unwanted direct current signals combined with the direct current analog signal corresponding to the unknown weight. The unwanted direct current signal may, for example, occur as a result of ageing of circuit components and changes in the environment such as the operating temperature of the system. It has therefore been necessary to periodically interrupt the operation of the weighing system to permit measurement and subsequent cancellation of the unwanted direct current signal. This interruption is, of course, also undesirable. Another difficulty has been in developing a satisfactory circuit for correcting the displayed weight for a tare weight to give a net weight reading, and to allow the use of electronic scales with digital readouts for batching several materials into a single weighing hopper using net weight settings for each material. Still another problem has occurred in attempting to vary the weighing increment and the total weighing range of digital weighing systems to comply with governmental regulations for commercial weighing.

SUMMARY OF THE INVENTION

According to the present invention, an improved electronic weighing system is provided for accurately measuring unknown weights and for indicating such weights in a digital format. The weighing system includes circuitry for automatically cancelling unwanted direct current signals from direct current analog signals which correspond to the unknown weight. The weighing system includes one or more transducers, such as load cells, for generating an analog signal proportional to the unknown weight. This signal is pre-amplified, digitized by means of an analog-to-digital converter and indicated on a digital readout device. Excitation voltage is periodically removed from the transducer to permit measurement and cancellation of the unwanted direct current signal from the analog portion of the weighing system. During the periods of interruption, a signal is sustained to the analog-to-digital converter corresponding to the analog signal just prior to interruption. Thus, the analog-to-digital converter will operate continuously, independent of the zero error cancellation sequence.

The analog-to-digital converter generates a train of pulses corresponding in number to the unknown weight. These pulses are counted in an up-down counter. The up-down counter may be preset with a tare weight which is to be subtracted from the measured weight for obtaining a net weight reading. The pulse train initially decrements the counter from the preset tare weight down to zero, and remaining pulses in the pulse train increment the counter up to the net load weight. When gross weight is to be measured, the counter is initially set to zero and counts upward only. Upon completion of counting the pulses in the pulse train from the converter, the contents of the counter are transferred to a storage register and the resulting data is displayed on a digital readout and is supplied to a digital output. Provision is made for changing the increment and range of the output of the analog-to-digital converter to control the range and resolution of the weighing system.

Accordingly, it is a preferred embodiment of the invention to provide an improved electronic weighing system.

Another object of the invention is to provide an improved electronic weighing system with a digital readout.

Another object of the invention is to provide improved circuitry for analog measuring systems in which unwanted direct current signals are cancelled from the system without interruption of the system output.

Still another object of the invention is to provide an improved method for cancelling unwanted signals from the output of an electronic scale.

A further object of the invention is to provide an improved means for presetting a digital scale with a tare weight such that the scale will indicate a net weight.

A still further object of the invention is to provide improved means for controlling the range and resolution of an electronic scale with a digital output.

Other objects and advantages of the invention will become apparent from the following detailed description, with reference being made to the accompanying drawings.

BRIEF DESCRIPTION OF THE DRAWINGS

FIG. 1 is a block diagram of an improved electronic weighing system according to the present invention;

FIG. 2 is a schematic logic diagram of an improved electronic weighing system according to the present invention;

FIG. 3 is a graph showing the timing of controls in the analog portion of the weighing system for cancelling unwanted direct current signals from the output of the analog circuitry;

FIG. 4 is a graph showing the operation and timing of the analog-to-digital converter;

FIG. 6 is a detailed logic diagram of the resolution circuit and the graduation circuit.

DESCRIPTION OF THE PREFERRED EMBODIMENTS

Figure 5:
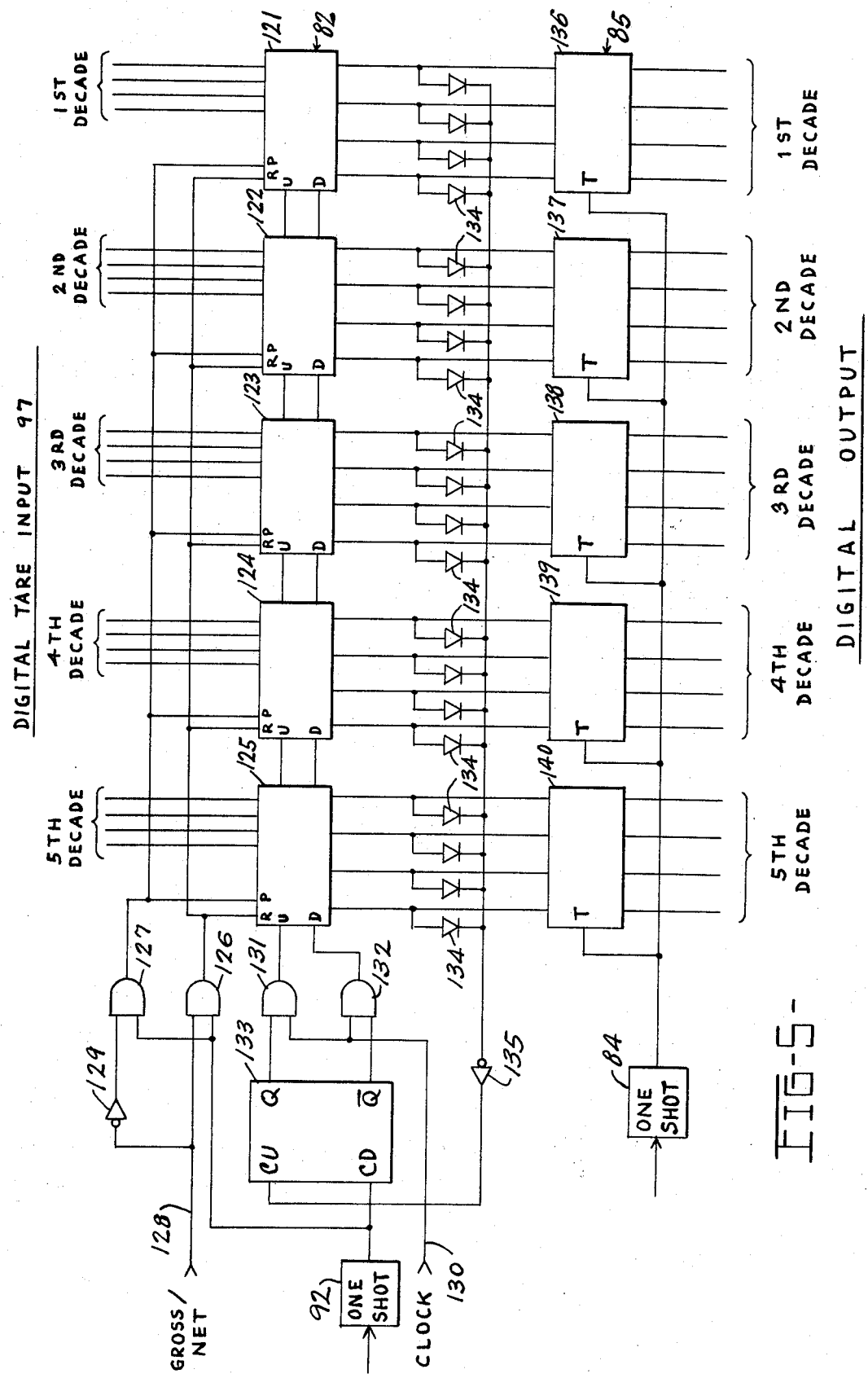
FIG. 5 is a detailed logic diagram of the display counters and related controls therefor.

Referring to FIG. 1, a block diagram is shown for an electronic weighing system 10 embodying the principles of the present invention. The weighing system 10 is provided with one or more load cells 11 or other suitable transducers which establish a direct current analog signal proportional to the unknown weight of an object being weighed. The output signal from the load cell 11 is amplified by an amplifier 12. However, the load cell 11 and the amplifier 12 may inherently include an unwanted direct current signal in the output of the amplifier 12. Although the amplifier 12 may be initially adjusted such that its output is zero when no weight is applied to the load cell 11, heat, voltage fluctuations and component ageing will cause the zero load amplifier output to drift from zero volts. An automatic zeroing circuit 13 is provided to periodically return the no load output of the amplifier 12 to zero, cancelling the effects of temperature, voltage fluctuations and component ageing.

The automatic zeroing circuit 13 operates to establish a zero voltage output from the amplifier 12 while excitation of the load cell 11 is momentarily interrupted. Since the load cell 11 is momentarily switched off, a gap will appear in the analog output signal from the amplifier 12. A gap fill circuit 14 is provided to fill the gaps in the analog output of the amplifier 12. A controller 15 periodically enables the gap fill circuit 14 and simultaneously disconnects the output of the amplifier 12 from the gap fill circuit 14. After the gap fill circuit 14 is enabled, power is removed from the load cells 11 by the controller 15 and the automatic zeroing circuit 13 is momentarily energized to zero the output of the amplifier 12. The controller 15 periodically repeats the automatic zero cycle, for example, the cycle may be repeated 120 times per second or every 8.3 milliseconds with the automatic zeroing procedure lasting on the order of 3.0 milliseconds.

The output of the gap fill circuit 14 is applied through a low pass filter 16 to an analog-to-digital converter 17, which may include an integrator 18. The filter 16 averages the analog output signal from the gap fill circuit 14. The operation of the integrator 18 is controlled by means of a controller 19 which causes the integrator 18 to alternately integrate the output of the filter 16 and a fixed reference voltage. During integration of the reference voltage, a clock 20 applies a pulse train to a counter 21. A zero level comparator 22 detects when the output of the integrator 18 returns to zero during integration of the reference voltage. When the reference voltage is integrated to a zero output from the integrator 18, the comparator 22 updates the contents of a storage register 23 by shifting data from the counters 21 into the register 23. This data corresponds to the unknown weight and is displayed on readout devices 24.

A digital over-range detector 25 senses when the capacity of the counter 21 has been exceeded. Similarly, an analog over-range detector 26 is connected to the output of the filter 16 for sensing when the analog capacity of the load cell 11 or the weighing system 10 has been exceeded. The controller 19 is responsive to the over-range detectors 25 and 26 for creating an over-capacity output which may be used for energizing an alarm such as a warning lamp or, possibly, for blanking the readout devices 24. In addition, the weighing system 10 is provided with a motion detector 27 which inhibits the controller 19 from outputing a "sync" or end of cycle pulse for operating a printer, for example, until the analog output of the filter 16 has reached a substantially steady state.

To summarize the operation of the electronic weighing system 10, an analog direct current signal appears at the output of the filter 16 which is proportional to the unknown weight placed on the load cell 11. The output of the filter 16 has been compensated for unwanted direct current signals which may occur in the amplifier 12. The integrator 18 in the converter 17 periodically integrates the output of the filter 16 and provides a controlled pulse stream from the clock 20 to the counter 21. The count in the counter 21, which corresponds to the weight applied to the load cell 11, is stored in a register 23 for display on the digital readout devices 24. The integration and output operation of the converter 17 is controlled by the controller 19. A sync pulse is generated by the controller 19 to signify that valid data is available at external outputs unless the motion detector 27 senses that the analog output of the filter 16 has not reached a substantially steady state. A digital over-range detector 25 is provided to detect when the capacity of the counter 21 has been exceeded and an analog over-range detector 26 is provided to detect when the capacity of the analog portion of the weighing system 10 has been exceeded.

Turning now to FIG. 2, a schematic logic diagram is shown for the electronic weighing system 10. The load cell 11 consists of four strain gauges 28 connected in a bridge arrangement for sensing an unknown weight and establishing a direct current signal proportional to the weight. It will be appreciated that other types of transducers may also be used for generating a signal corresponding to an unknown weight. The strain gauges 28 are supplied with power from a gated power supply 29. The power supply 29 and other power supplies used within the weighing system 10 are preferably designed to track or follow a single reference voltage to maintain a true voltage ratio system which is not affected by changes in the magnitude of the reference voltage.

The positive and negative analog output signals from the strain gauges 28 are connected to a pair of operational amplifiers 30 and 31, respectively. The differential gain of the two amplifiers 30 and 31 is determined by the sum value of the resistors 32 and 33 divided by the value of the resistor 34. The output of the amplifier 31 is connected to one input of an amplifier 35 through a resistor 36, while the output of the amplifier 30 is connected to a second input of the amplifier 35 through a voltage divider comprising a resistor 37 and a potentiometer 38. The potentiometer 38 is used to balance the two inputs to the amplifier 35 for maximum rejection of DC voltage common to both inputs of the amplifier 35. A feedback resistor 39 is placed between the output and the input of the amplifier 35 for controlling the gain of the amplifier 35. The amplifiers 30, 31 and 35 function as a preamplifier for the low level output signal from the strain gauges 28 and these amplifiers may have a gain on the order of 300 or more.

The output of the amplifier 35 is connected sequentially through a resistor 40, an operational amplifier 41 which controls the range or span of the system, a resistor 42, a normally closed switch 43 and an amplifier 44 to a filter 45. The amplifier 41 establishes the span or gain of the weighing system 10. A potentiometer 46 is connected across a voltage source for applying a controlled voltage through a resistor 47 to the input of the amplifier 44. The potentiometer 46 provides a fine adjustment for setting the output of the weighing system 10 to zero when no load is applied to the strain gauges 28. The negative output of the power supply 29 is connected through a variable resistor 48 to the input of the amplifier 41. The variable resistor 48 forms an initial or course adjustment for the zero of the weighing system. A variable feedback resistor 49 is connected between the output and the input of the amplifier 41 for use as a span or gain adjustment. After the weighing system is initially zeroed, using the resistors 46 and 48, a known weight near the maximum capacity of the weighing system 10 is placed on the load cell 11 and the variable resistor 49 is used to calibrate the system output to the known weight.

Transient effects caused primarily by heat, voltage variations and ageing of components in the amplifiers 30, 31, 35 and 41 may cause the output of the system 10 to drift from its initially zeroed setting. An automatic zeroing circuit is provided to compensate for these transient effects. The output of the amplifier 41 is connected through a normally open switch 52 and a resistor 53 to the input of an operational amplifier 54. A capacitor 55 is placed between the input and the output of the amplifier 54 to cause the amplifier 54 to integrate the input. The output of the amplifier 54 is connected through a resistor 56, an inverting amplifier 57 and a resistor 58 back to the input of the amplifier 41. A feedback resistor 59 is placed in parallel with the amplifier 57 to control the gain of the amplifier 57. When the switch 52 is closed, the amplifier 54 integrates the output of the amplifier 41 until the capacitor 55 is charged to a level sufficient to drive the output of the amplifier 41 to zero through the amplifier 57 and the resistor 58. If the switch 52 is then opened, the amplifier 54 will have a substantially constant output determined by the charge on the capacitor 55. The discharge rate of the capacitor 55 is quite slow due to the very high input impedance of the operational amplifier 54. As stated above, the output of the amplifier 54 is inverted by an amplifier 57 and applied to the input of the amplifier 41. Thus, the amplifier 41 will have an input comprising the sum of the amplified analog load cell voltage and the zero error voltage from the resistor 40, the zero control voltages from the variable resistor 48 and the automatic zero voltage from the resistor 58 which cancels the zero error voltage.

The switches 43 and 52 are preferably electronic switches such as field effect transistors. The switches 43 and 52 and the gated power supply 29 are controlled by a timing circuit 60. The timing circuit 60 controls the cycling of the automatic zero circuit at a convenient rate, for example, 120 times per second. A 60 Hz. commercial power source 61 may, for example, be connected through a one-shot multivibrator 62 for generating 120 pulses per second to periodically trigger the timing circuit 60. The timing pulse generated by the one-shot multivibrator 62 is shown at A on the graph in FIG. 3. Upon the occurrence of a timing pulse from the multivibrator 62, the timing circuit 60 opens the switch 43 to disconnect the amplified analog load cell signal from the amplifier 44. The timing of the operation of the switch 43 is shown at B in FIG. 3. Subsequent to the opening of the switch 43, the power supply 29 is gated off to remove power from the load cell 11 and the zero control resistor 48. Timing of the power supply 29 gating is shown at C in FIG. 3. When the power supply 29 is gated to an off position, the amplifier 41 may have an output if it has drifted from zero because of voltage transients, temperature effects or component ageing. At this time, the timing circuit 60 closes the switch 52 to connect the automatic zeroing circuit to the output of the amplifier 41. Timing of the operation of the switch 52 is shown at D in FIG. 3. When the switch 52 is closed, the amplifier 54 will rapidly integrate the output of the amplifier 41 until the charge on the capacitor 55 reaches a steady state, at which time the amplifier 54 will have a steady state output. This output is inverted by the amplifier 57 and supplied to the input of the amplifier 41 to cancel or zero the output of the amplifier 41. The switch 52 is then opened by the timing circuit 60. Immediately after the switch 52 is opened, the power supply 29 is gated on and, subsequently, the switch 43 is closed to again apply an analog output signal from the amplifier 41 to the input of the amplifier 44.

Each time the system 10 is automatically zeroed, it is apparent that the signal at the output of the amplifier 41 drops to zero. Thus, the signal applied to the filter 45 would tend to have gaps, as shown in C of FIG. 3, resulting from gating the power supply 29. However, the amplifier 44 is provided with a capacitor 63 and a resistor 64 to fill the gaps resulting from gating the power supply 29 for the load cell 11. The resistor 64 is connected from the output of the amplifier 44 through the switch 43 to the input of the amplifier 44 to control the gain of the amplifier 44 when the switch 43 is closed. The capacitor 63 is connected directly between the input and output of the amplifier 44. During the time that the switch 43 is closed, the capacitor 63 will be charged to a substantially steady state condition determined by the input and output of the amplifier 44. When the switch 43 is opened by the timing circuit 60, the steady state charge on the capacitor 63 will cause the amplifier 44 to hold its output, thereby filling gaps which would otherwise occur in the analog signal. During this time, the charge on the capacitor 63 will be maintained substantially constant due to the extremely high input impedance of the operational amplifier 44. Thus, the filter 45 will see a substantially continuous analog signal which will vary as the load on the load cell 11 varies.

The filter 45 is a low pass filter which averages the analog signal, and eliminates high speed transients on the analog weight signal. A four-pole conventional Bessel filter having a 24 db roll-off above 3 Hz. has been found suitable for most weighing applications. The analog output of the filter 45 is proportional to the weight applied to the load cell 11. This output signal may be used as an analog output controlling any apparatus which requires an analog signal proportional to weight, such as for operating a voltmeter which is calibrated in pounds.

The analog output of the filter 45 is applied through a resistor 68 and a normally open switch 69 to the input of an integrator comprising an operational amplifier 70 and a capacitor 71 connected between the output and the input of the amplifier 70. When the switch 69 is closed, the amplifier 70 will integrate the analog output from the filter 45. A negative regulated reference voltage, such as −15 volts, is also applied through a resistor 72 and a normally open switch 73 to the input of the amplifier 70 and a positive reference having the same voltage as the negative reference, e.g., +15 volts, is applied through a similar resistor 74 and a normally open switch 75 to the input of the amplifier 70. The switches 69, 73 and 75 are preferably each electronic switches such as field effect transistors or similar solid state gates. If the switch 73 is closed, the amplifier 70 will integrate the −15 volts or if the switch 75 is closed, the amplifier 70 will integrate the +15 volt reference. The polarity of the analog output from the filter 45 will be determined by the weight applied to the load cell 11. The filter output will have one polarity if a weight is applied to the load cell 11 and may have a second polarity if the system 10 is set to read under zero or if the system has drifted off zero.

The amplifier 70 functions as an integrator. The operation of the amplifier 70 will be more readily understood by referring to FIGS. 2 and 4. When the switch 69 is closed during a time interval $T_1$, the amplifier 70 will integrate the analog output of the filter 45 and will generate an output of the type shown for the time interval $T_1$ on the graph in FIG. 4. The output of the amplifier 70 will be either positive or negative, depending upon the polarity of the analog signal from the filter 45. The slope of the integrator output, with respect to time, will depend upon the magnitude of the applied voltage. If, for example, a relatively low voltage appears at the output of the filter 45, the amplifier 70 may have an output 76 with a small slope. If, on the other hand, the output of the filter 45 is increased to a high voltage, the output of the amplifier 70 will have a larger slope 77. After the predetermined fixed time interval $T_1$, the switch 69 is opened and one of the switches 73 and 75 is closed. If the output of the filter 45 was positive, the switch 73 is closed to connect the negative reference to the input of the amplifier 70 and, if the filter output was negative, the switch 75 is closed to connect the positive reference to the input of the amplifier 70. The amplifier 70 will then integrate in a reverse direction, producing an output similar to that shown for the time interval $T_2$ on the graph in FIG. 4. The starting point for the integration during the time interval $T_2$ is dependent upon the charge on the capacitor 71, which is in turn dependent upon the magnitude of the analog weight signal integrated during the fixed time interval $T_1$. Integration is continued for the indefinite time interval $T_2$ until the output of the amplifier 70 reaches zero, at which time the closed switch, 73 or 75, will be opened. Since the reference voltage is constant, the slope of the output of the amplifier 70, with respect to time, will be constant. Thus, the time required for the output of the amplifier 70 to reach zero is proportional to the charge on the capacitor 71 when the switch 73 or 75 is closed. If a 10 lb. weight, for example, is placed on the load cell 11 and the amplifier 70 integrates the resultant output from the filter 45 for the fixed time interval $T_1$, the amplifier 70 might require 50 milliseconds to integrate the charge on the capacitor 71 down to zero. If the weight applied to the load cell 11 is then doubled to 20 lbs., the amplifier 70 would require twice this time or 100 milliseconds to integrate the charge on the capacitor 71 down to zero. The output of the amplifier 70 is connected to an amplifier 78 which functions as the comparator 22. Whenever the output of the amplifier 70 changes polarity at zero volts, the output of the amplifier 78 will change polarity. Thus, the amplifier 78 continuously compares the output of the amplifier 70 to zero.

The integrating amplifier 70 forms a part of an analog-to-digital converter. As stated above, the time $T_2$ required to integrate the charge stored on the capacitor 71 down to zero, where the output of the amplifier 70 is zero, is directly proportional to the weight applied to the load cell 11. During this time interval $T_2$, pulses are clocked into a set of display counters 82. The display counters 82 may be of any conventional type and are preferably arranged in a binary coded decimal (BCD) format. One BCD counter is provided for each digit to be read out of the weighing system 10. In the embodiment described herein, the weighing system 10 is provided with a five digital readout consisting of five indicating devices 83, such as Nixie tubes. If a weight of 10 lbs., for example, is placed on the load cell 11 of a scale having a 20.000 lbs. capacity, 10,000 pulses may be clocked into the counters 82. The count stored in the counters 82 may, of course, be some other convenient multiple of 10. When the output of the integrating amplifier 70 reaches zero, the output of the comparing amplifier 78 changes to trigger a one-shot multivibrator 84. The multivibrator 84 then generates a transfer pulse for storing the contents of the counters 82 into a plurality of latches 85. The contents of the storage latches 85 are applied directly to a plurality of decoder/drivers 86 for continuously driving the readouts 83. If the readouts 83 are Nixie tubes, the decoder/drivers 86 will be BCD-to-decimal decoders or if the readouts 83 are segment type readout devices in which numbers 0 through 9 are formed by illuminating predetermined combinations of seven different segments, the decoder/drivers 86 will be BCD-to-seven segment decoders. The decoder/drivers 86 may also include an inhibit input 87 for blanking the readouts 83.

The integration performed by the amplifier 70 is controlled by a clock 88, control counters 89 and an up-down toggle flip-flop 90. The flip-flop 90 has a Q output which is high during the time interval $T_1$. The high Q output of the flip-flop 90 is used to close the switch 69, causing the amplifier 70 to integrate the analog output from the filter 45. The high output Q also triggers a one-shot multivibrator 91 for generating a main reset pulse which clears or presets the display counters 82.

The clock 88 is designed to provide a 200 KHz. clock signal which is applied to the control counters 89 in addition to the display counters 82. It will of course be appreciated that other clock frequencies may also be used with the appropriate and obvious modifications made to the circuitry. With the clock frequency of 200 KHz. and a maximum weight of 20 lbs., the control counters 89 are designed to count up to 20,000 pulses, which requires 100 milliseconds. On a count of 20,000, a one-shot multivibrator 92 generates a pulse for triggering the up-down flip-flop 90 to change states and for clearing the control counters 89. Thus, when the flip-flop 90 is triggered to generate a high Q output, a main reset pulse is generated by the multivibrator 91 which either clears or presets the display counters 82 and the switch 69 is closed to initiate integration by the amplifier 70. Integration of the unknown analog signal from the filter 45 will continue for a fixed time interval of 100 milliseconds, or until the control counters 89 count to 20,000.

On a count of 20,000, the one-shot multivibrator 92 will generate a trigger pulse which again clears the control counters 89 and changes the state of the flip-flops 90 to have a low Q output and a high $\bar{Q}$ output. The high $\bar{Q}$ output of the flip-flops 90 is applied to enable a pair of NAND gates 93 and 94. The output of the NAND gate 93 is connected to control the switch 73 for connecting the negative reference to the input of the integrating amplifier 70 and the output of the NAND gate 94 is connected to the switch 75 for connecting the positive reference to the input of the integrating amplifier 70. A polarity latch 95 will apply a high signal to one of the gates 93 and 94 for energizing one of the switches 73 and 75. Upon the occurrence of a count of 19,999 by the control counters 89 at the end of the time interval $T_1$, a NAND gate 96 will apply a trigger pulse to the polarity latch 95. The polarity latch 95 will then apply an output to one of the gates 93 and 94, which is selected by the polarity of the output from the comparing amplifier 78. If the amplifier 70 is integrating a positive unknown analog signal from the filter 45, the gate 93 will be energized such that the switch 73 will close during the time interval $T_2$ to apply the negative reference voltage to the amplifier 70. If on the other hand the amplifier 70 is integrating a negative unknown analog signal, the polarity latch 95 will be set such that the gate 94 causes the switch 75 to close during the time interval $T_2$ to apply the positive reference voltage to the amplifier 70.

Each time the control counters 89 count to 20,000, the one-shot multivibrator 92 applies a pulse to set the display counters 82. The display counters 82 may be preset with a tare signal corresponding to the tare weight on the load cell 11. The tare signal may be provided automatically or it may be provided by a plurality of manual switches connected to tare inputs 97 for the counters 82. If it is not desired to preset the display counters 82 with a tare weight or some other weight, the display counters 82 may be reset to zero. The display counters 82 are up-down counters. After the digital tare weight is stored in the counters 82 at the beginning of the time interval $T_2$, the tare contents of the counters 82 will be counted down or decremented to zero by pulses from the clock 88. The display counters will then continue to count in an upward direction or increment until the reference voltage has been integrated to a zero output by the integrating amplifier 70. When the output of the amplifier 70 reaches zero volts, the comparator circuit 78 changes state to trigger the one-shot multivibrator 84. The multivibrator 84 then applies a transfer pulse to the latches 85, transferring the contents of the display counters 82 into the latches 85.

The signal stored in the latches 85 will correspond to the net weight on the load cell 11 if the counters 82 were initially preset with the tare weight on the load cell 11, or it will correspond to the gross weight on the load cell 11 if the counters 82 were initially cleared to zero. The signals stored in the latches 85 are decoded by the decoder/driver 86 and applied to the readouts 83. This output will be maintained on the readouts 83 until the end of the next integration cycle when the one-shot multivibrator 84 transfers a new count from the display counters 82 into the latches 85. The latches 85 are also provided with auxiliary BCD outputs 98 which may be used, for example, for operating a printer (not shown) or for supplying data to a computer. The transfer one-shot multivibrator 84 may be provided with a manual inhibit input 99 for inhibiting a change in the contents of the latches 85 during printing or for any other reason.

The printer, if used, can be controlled by a sync pulse output from a NAND gate 100. The NAND gate 100 has an input connected to the output of the one-shot multivibrator 91 which generates the "main reset" pulse at the end of each integrating cycle. The NAND gate 100 has a second input connected to a logic level converter 101. The analog output of the filter 45 passes through a resistor 102, a capacitor 103 and an amplifier 104 to the converter 101. A feedback resistor 105 is provided between the output and the input of the amplifier 104 to control the gain of the amplifier 104. The capacitor 103 causes the amplifier 104 to differentiate the analog output signal from the filter 45. The output of the amplifier 104 will vary in magnitude with fluctuations in the analog signal from the filter 45. The logic level converter 101 senses variations in the output from the amplifier 104 and applies a low logic signal to the gate 100 when the output of the amplifier 104 exceeds a predetermined voltage level. If the amplifier 104 has no output because motion on the load cell 11 has settled, the motion detector 101 will generate a high logic output, enabling the gate 100 to pass pulses from the one-shot multivibrator 91. The pulses passed through the gate 100 may be used for controlling the printer or for any other purpose where a pulse is required to signify that data is ready at the outputs 98 to be read. If the amplifier 104 has a higher output as a consequence of a dynamic load on the load cell 11, the level converter 101 will generate a logic signal to inhibit the gate 100. A switch 106 may be provided for disconnecting the output of the level converter 101 from the gate 100 allowing the "sync pulse" to be outputed from the gate 100 at the end of each cycle regardless of motion.

The weighing system 10 is also provided with an over-capacity alarm which may comprise a warning lamp 110. The analog output signal from the filter 45 which corresponds to the weight on the load cell 11 is applied through a resistor 111 to the input of an amplifier 112. The same input of the amplifier 112 is connected through a resistor 113 to a controlled voltage from a potentiometer 114 and a voltage source. The voltage applied through the resistor 113 to the amplifier 112 is set with the potentiometer 114 to establish a predetermined maximum weight for the load cell 11. If this weight is exceeded, the amplifier 112 will generate an output which is applied through an OR gate 115 to illuminate the lamp 110. The OR gate 115 has a second input, from a NAND gate 116. The NAND gate 116 has two inputs, one connected to the $\bar{Q}$ output from the up-down flip-flop 90 and a second one connected to the 20,000 count output from the control counters 89. In the event that a count of 20,000 is reached by the control counters 89 during the time interval $T_2$, indicating that the capacity of the display counters 82 has been reached prior to the amplifier 70 integrating the reference to a zero voltage, the NAND gate 116 energizes the warning lamp 110. Through this circuitry, the control counter 89 forces an end to the time interval $T_2$, even though integration of the reference has not been completed. Thus, the weighing system 10 is provided with an over-capacity alarm both for the load cell 11 and for the digital counters 82. The output of the gate 115 also may be applied to the input 87 of the decoder 86 for blanking the readouts 83 during overload conditions.

The weighing system 10 is preferably also provided with a resolution circuit 117 and a graduation circuit 118 which are connected in series between the 200 KHz. clock 88 and the display counters 82. The resolution circuit 117 comprises conventional frequency dividers which may be turned on for controlling the number of pulses passed from the clock 88 to the display counters 82. In one embodiment, the resolution circuit 117 is provided with three ranges, divide by one, divide by two and divide by 10, which are manually selected. In the divide by one setting, each pulse from the clock 88 will be applied to the display counters 82. If in the divide by one setting the weighing system 10 reads to 20.000 lbs., the system will read to 20.00 lbs. in the divide by 10 setting of the resolution circuit 117. Since 10 pulses from the clock 88 are required for each count in the counter 82 while all 10 pulses are counted in the control counter 89, the stability of the weighing system 10 will be increased by a factor of 10.

The graduation circuit 118 is provided to multiply the output pulses from the resolution circuit 117 by a preselected factor, for example, a factor of one, two or five. If the resolution circuit 117 is set to divide by 10, as described above, to read to 20.00 lbs., and the graduation circuit is set to multiply by two, the scale will read to 40.00 lbs. in 0.02 lb. increments. As a result, the weighing system 10 may be adapted for installation with load cell 11 having different weight ranges and, by use of the resolution circuit 117 and the graduation circuit 118, the weight resolution covered by the readouts 83 may be controlled, as well as the stability of the scale may be controlled.

Referring now to FIG. 5, the logic is shown in detail for the display counters 82 and the latches 85. The display counters 82 consist of five separate up-down counters 121-125 for storing in BCD format five decades of weight. Either fewer counters or additional counters may be used if the weighing system 10 is to have a different number of decades of readout. The contents of the counters 121-125 are initially set by means of a pair of AND gates 126 and 127. The gates 126 and 127 each have an input from the one-shot multivibrator 92 which provides a pulse each time the control counter 89 counts to 20,000. The gate 126 has a second input 128 which determines whether the scale reads gross or net weight. The input 128 may be set by a manual switch to a logic one for gross weight or a logic zero for net weight. When the input 128 is at a logic one, and upon the occurrence of the next output pulse from the multivibrator 92, the gate 126 will have an output which resets or clears each of the counters 121-125 to zero. The input 128 is also connected through an inverter 129 to the gate 127. When the input 128 is set at a logic zero and the multivibrator 92 produces an output pulse, the gate 127 will have a high output for presetting the counters 121-125 with the tare weight present at the digital tare input 97. The tare weight is applied in a digital format to the counter inputs 97 either from manual switches or from an automatic tare circuit (not shown).

The counters 121-125 are counted by means of the clock signal applied from the clock 88 through the resolution circuit 117 and the graduation circuit 118 to a clock input 130. The clock input 130 is applied to an up count gate 131 and to a down count gate 132, one of which is enabled by a flip-flop 133. When the flip-flop 133 enables the up count gate 131, each clock pulse appearing on the input 130 increments the counters 121-125 up by one. Similarly, when the flip-flop 133 enables the down count gate 132, each clock pulse appearing on the input 130 decrements the counters 121-125 down by one. At the time the counters 121-125 are initially either cleared to zero or preset with the tare weight, the one-shot multivibrator 92 sets the flip-flop 133 to a count down position. The counters 121-125 are then counted down by clock pulses appearing on the input 130. Each output line from the counters 121-125 is connected through a separate isolation diode 134 to the input of an inverter 135. When each of the outputs is at zero, the inverter 135 will have a low input and a high output for setting the flip-flop 133 to count up. Pulses appearing on the clock input 130 will then increment the counters 121-125 up. The counters will continue to count until the amplifier 70 (FIG. 2) completes integration and the one-shot multivibrator 84 transfers the count in the counters 121-125 into five decade latches 136-140, respectively. The weight stored in the latches 136-140 is applied to the decoder 86 for indication on the readouts 83 and to the auxiliary outputs 98.

Referring to FIG. 6, detailed logic is shown for the resolution circuit 117 and the graduation circuit 118. The clock 88 is shown as consisting of a 1.6 MHz. clock source 144 and a circuit 145 for counting the output of the clock source 144 down to 200 KHz. The resolution circuit 117 may consist of a decade counter and decoder 146 for counting the 200 KHz. pulses from the clock 88. The counter and decoder 117 has 10 outputs corresponding to the numbers one through 10. If, as described in the above example of the resolution circuit 117, the resolution circuit 117 is designed to divide by one, two and 10, a connector such as a switch or a jumper is provided for selectively connecting the one-count, the two-count and the 10-count outputs of the counter and decoder 146 to a terminal 147. The 10-count terminal is shown connected by means of dashed lines to the terminal 147. The terminal 147 will then have an output each time the counter and decoder 146 is counted to 10 by pulses from the clock 88. Thus, there is a single output pulse on the terminal 147 for every ten input pulses to the counter and decoder 146 and the counter and decoder 146 has in effect divided by 10. The terminal 147 is connected to a "reset" input on the counter and decoder 146 for resetting the counter and decoder 146 each time a pulse appears on the output terminal 147.

The graduation circuit 118 may consist of a flip-flop 148, an AND gate 149 and a decade counter and decoder 150. The output of the resolution circuit 117 appearing on the terminal 147 is connected to the set input of the flip-flop 148. When the flip-flop 148 is set, a high Q output enables the AND gate 149 to pass the 1.6 MHz. clock pulses from the clock source 144. The 1.6 MHz. clock pulses are also used to count up the counter and decoder 150. In the example given above, the graduation circuit 118 was designed to multiply by one, by two and by five. A connector such as a switch or a jumper is therefore provided for connecting the one, the two and the five outputs from the decade counter and decoder 150 to a terminal 151. The terminal 151 is connected to reset the counter and decoder 150 and to reset the flip-flop 148. If the five-count output from the counter and decoder 150 is connected to the terminal 151, as shown in dashed lines, a pulse will be applied to the terminal 151 for every five clock pulses from the 1.6 MHz. clock source 144 and the flip-flop 148 will be reset to inhibit the AND gate 149. Thus, it is readily apparent that after the flip-flop 148 is set by a single pulse from the resolution circuit 117, the AND gate 149 will pass five pulses from the clock source 144 and the flip-flop 148 then will be reset to inhibit the AND gate 149. If, on the other hand, the one-count output of the counter and decoder 150 had been connected to the terminal 151, the AND gate 149 would be inhibited after passing only a single pulse. The output of the AND gate 149 supplies a train of pulses to the display counter 82.

The above-described embodiment of an electronic scale with a digital readout is particularly useful for directly batching materials without the use of a separate weighing hopper. If the batch material is stored in a hopper which is positioned on the load cell 11 and the system was initially zeroed to include the empty weight of the hopper, the scale will indicate the total weight of material present in the hopper when the gross weight is requested. This weight may be used to determine if sufficient material remains for a new batch. If the display counters 121-125 are then preset for a tare weight consisting of the total weight of the material in the hopper, the counters 121-125 will be counted down by a value corresponding to the remaining weight of material in the hopper and will indicate a zero net weight. As material is removed from the hopper, the scale will indicate a negative value which corresponds to the weight of batch material removed. Thus, a single scale of weighing system may be used for indicating the quantity of batch material present in a hopper and, during batching, the quantity of material removed from the hopper.

It will be appreciated that various modifications and changes may be made in the above-described system without departing from the spirit and the scope of the claimed invention. The system may, for example, be modified by changing the weighing range or by using a different type of integrator. In addition, the automatic zero circuit and the related gap fill circuit, as well as the resolution circuit and the digital circuitry, may be used with other types of systems. It will also be appreciated that the disclosed and claimed circuitry is adaptable for uses other than weighing. If, for example, an unknown voltage is applied to the system in place of the analog weight signal from load cells, the system may function as a digital voltmeter. Or, the system may be adapted to measure conditions other than weight. The transducer may, for example, consist of a pressure sensor which produces a voltage proportional to a sensed pressure level. In this event, the digital output from the system is an accurate measure of sensed pressure.

What we claim is:

1. An electronic weighing system comprising, in combination, transducer means for establishing an analog signal corresponding to an unknown weight, means for amplifying such analog signal, means for indicating the weight corresponding to the amplified analog signal, means for periodically interrupting the analog signal, means operable while the analog signal is interrupted for setting the output of said amplifying means to zero, and means operable while the analog signal is interrupted for causing said indicating means to indicate the weight corresponding to the amplified analog signal prior to interruption of the analog signal.

2. An electronic weighing system, as defined in claim 1, wherein said indicating means includes a digital readout, and converter means for generating from the amplified analog signal a digital signal corresponding to the unknown weight, and means for applying the digital signal to said digital readout.

3. An electronic weighing system, as defined in claim 1, and including low pass filter means for averaging signals applied to said indicating means, said filter means having a cut-off frequency below the frequency at which the analog signal is periodically interrupted.

4. An electronic weighing system, as defined in claim 3, wherein said indicating means includes a digital readout, converter means for generating from the filtered signals a digital signal corresponding to the unknown weight, and means for applying the digital signal to said digital readout.

5. An electronic weighing system, as defined in claim 4, wherein said converter means generates a pulse train having a pulse count proportional to the unknown weight, and wherein said means for applying the digital signal to said digital readout includes means for counting the number of pulses in the pulse train, and means for applying such pulse count to said digital readout.

6. An electronic weighing system, as defined in claim 5, wherein said counting means includes an up-down counter, means for storing an initial predetermined count in said counter, means for counting said counter down from the initial count with at least a portion of the pulses in the pulse train, means for detecting if the counter reaches a predetermined minimum count, and means for counting said counter up from such minimum count with any remaining pulses in the pulse train.

7. An electronic weighing system, as defined in claim 5, and including means for changing the number of pulses in the pulse train generated by said converter means whereby the range of said weighing system is changed.

8. An electronic weighing system, as defined in claim 4, wherein said converter means comprises an integrator, means controlling said integrator to integrate the filtered signal for a predetermined time interval and subsequently to integrate a reference voltage having a polarity opposite to the polarity of the filtered signal until the output of the integrator reaches a predetermined level wherein the time interval required to integrate said reference voltage is a function of the unknown weight, and means for generating a train of clock pulses during the time interval in which the reference voltage is integrated.

9. An electronic weighing system, as defined in claim 8, wherein said converter means further includes means for counting the number of clock pulses in the clock pulse train, means for storing such clock pulse count, and means for applying the stored count to said digital readout.

10. An electronic weighing system, as defined in claim 9, and including means for causing a count corresponding to only a portion of the number of clock pulses generated to be stored in said storage means.

11. An electronic weighing system, as defined in claim 9, and including means for storing a predetermined count in said counting means prior to integrating said reference voltage, and means for subtracting the stored predetermined count from the clock pulse count.

* * * * *